United States Patent [19]
Pandelisev

[11] Patent Number: 5,521,385
[45] Date of Patent: May 28, 1996

[54] LONG LIFE GAMMA CAMERA PLATE ASSEMBLY WITH IMPROVED REFLECTOR SYSTEM

[75] Inventor: Kiril A. Pandelisev, Mesa, Ariz.

[73] Assignee: Optoscint, Inc., Mesa, Ariz.

[21] Appl. No.: 203,574

[22] Filed: Mar. 1, 1994

[51] Int. Cl.$^6$ ................................................ G01T 1/161
[52] U.S. Cl. ...................................... 250/363.02; 250/368
[58] Field of Search ................................ 250/368, 367, 250/369, 363.02, 363.10

[56] References Cited

U.S. PATENT DOCUMENTS

| | | |
|---|---|---|
| 2,853,621 | 9/1958 | Ruderman . |
| 3,784,819 | 1/1974 | Martone et al. . |
| 4,029,964 | 6/1977 | Ashe . |
| 4,267,453 | 5/1981 | Kieboom et al. . |
| 4,280,051 | 7/1981 | Engdahl et al. . |
| 4,631,409 | 12/1986 | Sparacia et al. . |
| 4,658,141 | 4/1987 | Wilt et al. . |
| 4,720,426 | 1/1988 | Englert et al. . |
| 5,132,539 | 7/1992 | Kwasnick et al. . |
| 5,148,029 | 9/1992 | Persyk et al. . |
| 5,179,284 | 1/1993 | Kingsley et al. . |
| 5,229,613 | 7/1993 | Pandelisev . |
| 5,237,179 | 8/1993 | Williams et al. . |

Primary Examiner—Davis L. Willis
Assistant Examiner—Richard Hanig
Attorney, Agent, or Firm—James Creighton Wray

[57] ABSTRACT

This invention relates to a fabrication of a gamma camera plate assembly that has long life and improved efficiency. Cladding and reflecting layers provide improvements in crystal output. Seals prevent moisture leaks, prolonging lifetime. Multi-barrier epoxy-filled seals and desiccant-filled recesses, elastomer-filled spaces and an extra optical coupling layer provide prolonged life and improved efficiency. Exterior rings with new glass-to-metal seals and metal-to-metal seals provide strong watertight assemblies. The gamma camera plate includes a crystal having an optical cladding and a reflector surrounding the cladding. A glass mounting plate is connected to one flat surface of the crystal by an optical coupler. A mounting ring surrounds the crystal and an outer surface of the glass plate. Barriers are formed in upper and lower surfaces of the mounting ring, and complementary barriers are formed in engaging surfaces of the glass plate and of the gamma ray window plate. Recesses within the barriers hold desiccant. An elastomer fills a space between the central opening in the mounting ring and the crystal, and an optical coupler fills the space between the window and the reflector. Auxiliary rings connect an outer surface of the glass plate through glass-to-metal seals and metal-to-metal seals with the main mounting ring. Thin low heat sink rings form the final metal-to-metal seals to prevent heat transfer to the crystal.

52 Claims, 2 Drawing Sheets

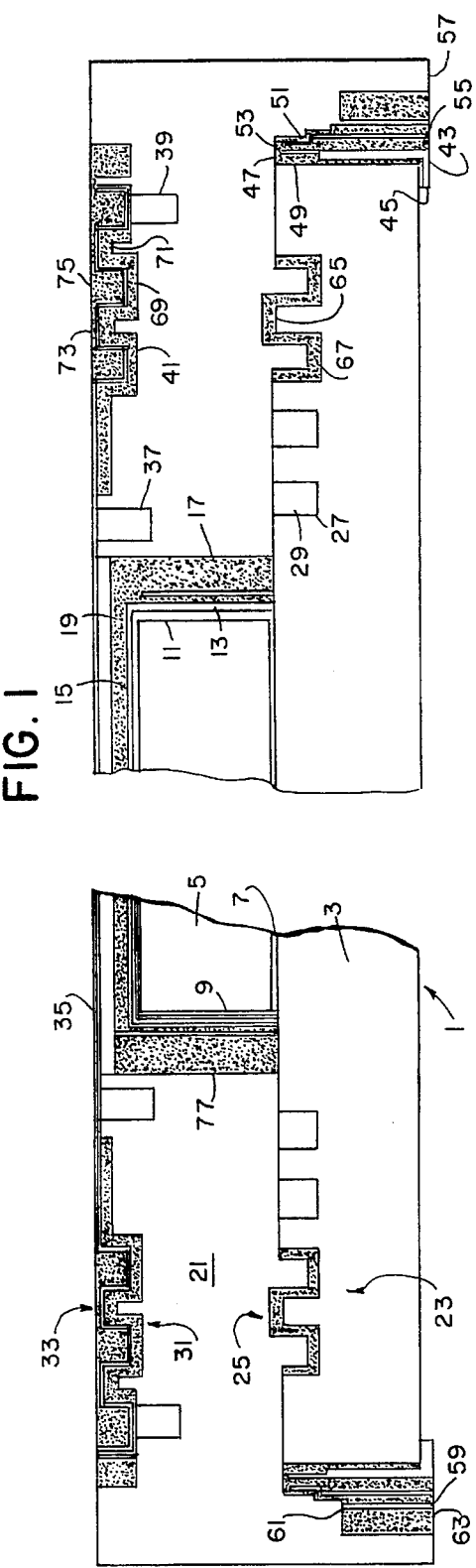
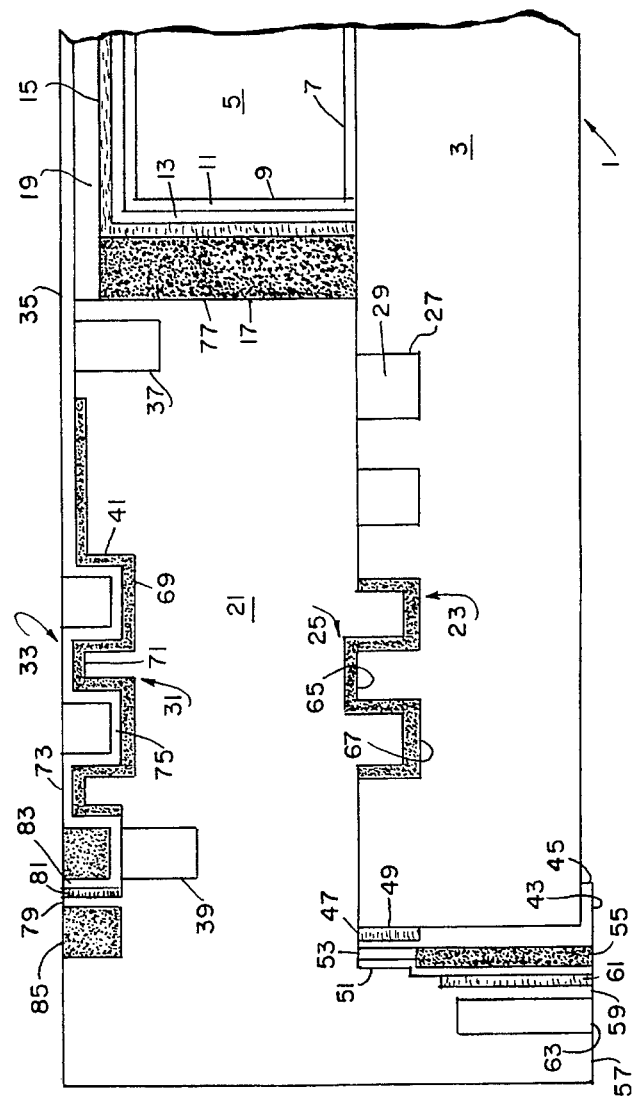
FIG. 1
FIG. 2

LONG LIFE GAMMA CAMERA PLATE ASSEMBLY WITH IMPROVED REFLECTOR SYSTEM

BACKGROUND OF THE INVENTION

The present invention relates to scintillation crystal plate assemblies used in gamma cameras.

Prior art crystal plate assemblies are sealed using epoxies and various resins. Light reflectors used on crystals MgO powder applied on the crystal surfaces by spraying or painting a solution of white oxide powder and organic water-free base.

Crystal plate assemblies prepared using the prior art procedures have short lifetimes. Prior art plate assemblies do not allow optimum efficiency. Available crystal plate assemblies do not permit use of thin glass plates, since crystals are supported only by the glass plates.

Needs have long existed for improved gamma camera plates. Specifically, needs have existed for lighter weight assemblies. Gamma camera plates are needed which will have long life and improved efficiency.

SUMMARY OF THE INVENTION

The current invention provides new special crystal sealing procedures for gamma camera plates that extend their useful lifetimes and allow for reflective systems that increase the efficiency of the gamma camera so as to produce a sharper image of the human organ/body being investigated.

The present invention allows for hermetic sealing of the hygroscopic sodium iodide crystals by multi-barrier seals. The new seals of the invention use (1) epoxy, (2) mixtures of epoxy, glass-to-metal seals and metal-to-metal soldering, and (3) all welded joints and glass-to-metal seals, all with new physical shapes and constructions.

In the new all-epoxy multi-barrier seals, barriers have been introduced to prevent crack propagation in the epoxy, as well as to prevent possible moisture penetrating past those cracks. The crystals are further sealed by cladding layers and reflective coatings. All crystals are encapsulated by cladding layers and optical couplers.

The combination of epoxy, glass-to-metal and metal-to-metal soldering is introduced by this invention to facilitate some mechanical advantages of assembly for sealing sodium iodide (NaI) thallium-doped crystals. This method, as in the all epoxy method, provides hermetic seals for the crystal plates and allows for crystal encapsulation in cladding layers and reflective coatings, and by doing so it allows for increased efficiency of the gamma cameras.

Most rugged and easiest to apply is the welding and glass-to-metal seal approach. This combination produces hermetic seals that provide for long life of the gamma camera plate assemblies. This approach also provides full crystal encapsulation by means of cladding layers and diffusive or metal reflective coating.

All three approaches of this invention lead to long life gamma camera assemblies with improved energy characteristics. The invention eliminates special mountings for the assemblies required by various manufacturers. The invention eliminates the need for the design of special tools used in the gamma camera plate assembly fabrication processes and improves crystal sealing.

The present invention provides unique approaches for extending the life of gamma camera plate assemblies, and increases efficiency through introduction of high quality reflectors. The invention improves resolving capabilities of gamma cameras. Resolution is in part a function of spacing between a crystal plane and photomultiplier input windows. The invention allows for reducing the glass plate thickness by a factor of four or more.

The multi-barrier seal for this long life, higher efficiency gamma camera plate assembly is made by using only epoxy, or by epoxy, glass-to-metal and metal-to-metal soldering, or by glass-to-metal seals and metal-to-metal welding. All three combinations lead to an improved gamma camera plate assembly. The difference between the approaches is only in the design of various parts of the gamma camera and its assembly process.

The all-epoxy sealed gamma camera plate assembly consists of a mounting ring, a glass plate, a crystal with a multi-layer metal reflector and a thin aluminum gamma ray window.

First the crystal with the reflector is attached to the glass plate with an optical coupler. The glass plate with the crystal is then attached to the metal barrier using epoxy. A multi-barrier seal is used to prevent crack propagation and moisture penetration through the cracks.

Fastening of the crystal to the metal barrier is done in two steps. First the space between the crystal and the metal barrier is filled with a silicone rubber material. In this way the glass plate is relieved of the weight of the crystal, and at the same time serves as a barrier for possible moisture penetration. The part above the elastomer and the multi-layered reflector is filled with optical coupling material stable to the exposure of the gamma rays. The aluminum radiation window is placed on the top using the multi-barrier seal assembly.

The no-epoxy seal gamma camera assembly of this invention consists of three metal rings, a glass plate, crystal with a multi-layer reflector, and an aluminum gamma ray window.

First the glass plate is connected to the first ring with a glass-to-metal seal. For this purpose the glass is doped with lead and the soldering is done with In-Zn alloy having a melting point between 200° C.–300° C.. The ratio of indium vs. zinc determines the exact melting temperature. The metal ring is either stainless steel or aluminum electroplated with Zn.

The glass plate and ring assembly is welded to the second ring surrounding the first metal ring. A seam weld is used for this purpose. After that, using an optical coupler, the crystal with the already deposited reflector is mounted on the glass plate with the two metal ring assemblies.

The third ring is then connected to the second ring by seam welding. After fastening the crystal to the third ring with silicone rubber and optical coupling material, the gamma ray window is welded to the third ring.

All contact surfaces contain moisture barriers consisting of pockets of desiccant.

The epoxy, glass-to-metal seal, metal-to-metal soldering gamma camera plate assembly consists of a glass plate, a crystal with a multi-layer reflector, three metal barriers and an aluminum gamma ray window.

First the glass plate is connected to the first (inner) metal ring by a glass-to-metal seal. Here the ring is Al or stainless steel electroplated with Zn, and the glass surface is doped with Pb or indium and a glass-to-metal seal is formed. The glass plate-inner ring assembly is then soldered to the second (middle) ring using the same In-Zn solder.

After that the crystal with the multi-layer reflector is connected to the glass plate with the optical coupler.

The middle ring is either soldered or welded to the third outer metal ring, and a multiple ring seal is applied between the glass plate and the third ring as an extra measure for ensuring strength and moisture barrier.

The crystal is fastened to the third ring by a silicone rubber and optical coupling layer over the crystal. The aluminum gamma ray window is connected to the top surface of the top ring using either metal-to-metal soldering or seam welding.

All three embodiments of this invention and other combinations provide for fabrication of long life, higher efficiency gamma plate assemblies. The spacial resolution of a gamma camera employing the plate assembly of this invention is improved when the thin glass plate is used.

A gamma camera plate includes a crystal having an optical cladding and a reflector surrounding the cladding. A glass mounting plate is connected to one flat surface of the crystal by an optical coupler. A mounting ring surrounds the crystal and an outer surface of the glass plate. Barriers are formed in upper and lower surfaces of the mounting ring, and complementary barriers are formed in engaging surfaces of the glass plate and of the gamma ray window plate. Recesses within the barriers hold desiccant. An elastomer fills a space between the central opening in the mounting ring and the crystal, and an optical coupler fills the space between the window and the reflector. Auxiliary rings connect an outer surface of the glass plate through glass-to-metal seals and metal-to-metal seals with the main mounting ring. Thin low heat sink rings form the final metal-to-metal seals to prevent sealing heat transfer to the crystal.

These and further and other objects and features of the invention are apparent in the disclosure, which includes the above and ongoing written specification, with the claims and the drawings.

BRIEF DESCRIPTION OF THE DRAWINGS

FIG. 1 is a cross-sectional view of a gamma camera plate showing a crystal, a glass mounting plate, a sealing ring and combination seals showing the multiple barriers and epoxy seals, glass-to-metal seals and metal-to-metal seals.

FIG. 2 is an enlarged cross-sectional detail of the structure shown in FIG. 1.

DETAILED DESCRIPTION OF THE DRAWINGS

Figure 3:
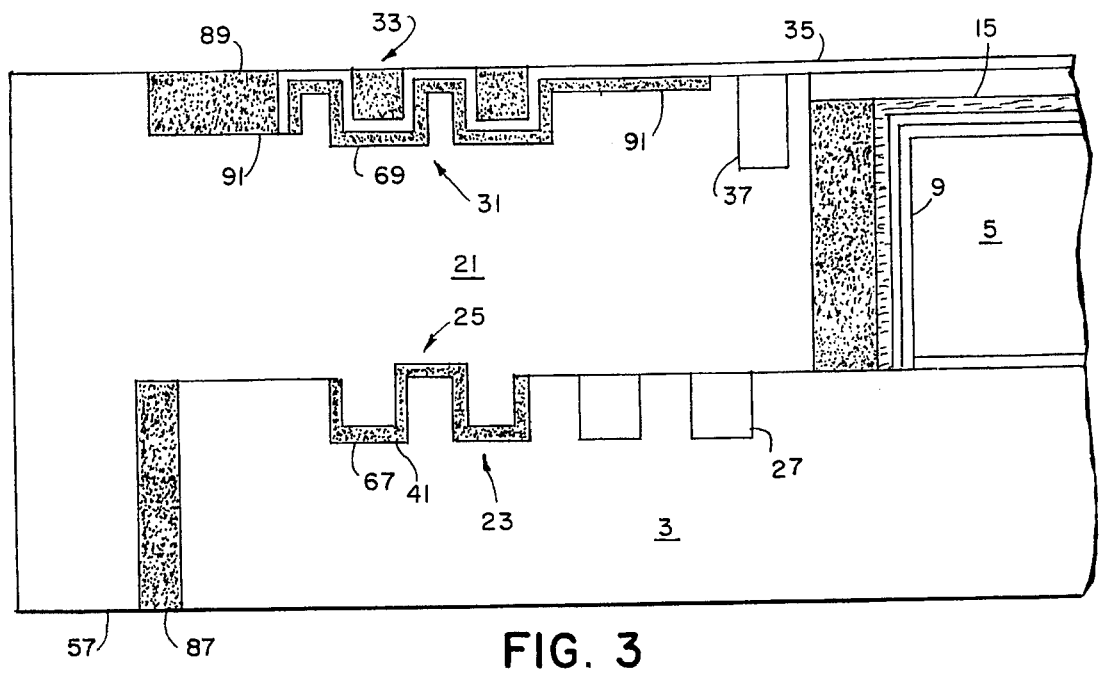
FIG. 3 is an enlarged cross-sectional detail of an edge of a crystal and mounting plate assembly showing a crystal, a glass mounting plate, a mounting ring and epoxy disposed in multi-barrier seals.

Referring to FIGS. 1 and 2, a gamma camera plate assembly is generally indicated by the numeral 1. The gamma camera plate assembly has a large glass mounting plate 3 and a crystal 5 joined to the mounting plate by an optical coupler 7. The crystal is surrounded by cladding 9, which is made up of first and second layers 11 and 13 respectively. The cladding is surrounded by a reflective layer 15. The reflective layer 15 is surrounded by an elastomeric layer 17, and the elastomeric layer 17 is overlaid by an optical coupler layer 19. A large metal ring 21 surrounds the outer surface of the crystal and the outer surface of the mounting plate.

Barriers 23 in the mounting plate cooperate with complementary barriers 25 in the mounting ring, and recesses 27 in the glass mounting plate hold desiccant 29. Similar complementary barriers 31 are formed in the mounting plate to inter-engage complementary barriers 33 in the gamma ray window 35.

Recess 37 in the mounting ring 21 receives desiccant 29. Recess 39 also receives desiccant to prevent ingress of moisture beyond the barriers.

Epoxy 41 is disposed in the inter-engaging barriers.

A first metal ring 43 surrounds an outer end of the glass plate 3. A lower inward projecting lip 45 on the first metal ring 43 underlies an outer lower surface portion of the plate 3. Metal ring 43 is joined to an outer surface of the glass plate by a glass-to-metal seal 47. Preferably the surface of the glass plate 3, which is adjacent the glass-to-metal seal 47, is doped with a metal which is compatible to a metal in the alloy, which preferably forms the glass-to-metal seal 47.

The dopant may be lead or indium and the alloy, for example, may be a zinc indium alloy, which has a melting point between about 200° C. and 400° C., depending on the composition.

The first metal ring 43 may be a zinc-plated aluminum or stainless steel ring.

A second metal ring 51 is joined to the first metal ring by a metal-to-metal seal 53 which may be an appropriate alloy, such as an indium-zinc alloy, with an appropriate melting point, such as from about 200° C. to about 400° C.

The metal-to-metal seals are made at the top of the ring, and wide space at the bottom of the ring is filled with an elastomer 55.

The mounting ring 21 is formed with an extended outer surface 57, which serves as a mechanical protection for the outer seals and as a locus for coupling to the main gamma camera assembly.

A thin metal ring 59 is formed in the mounting ring 21, and the thin metal ring 59 is joined to the second metal ring 51 by a metal-to-metal seal 61, or by welding. The gap 63 between the thin integral metal ring 59 and the outer extension 57 is filled with an elastomer.

The first, second and third rings allow the first and second rings to be joined by alloys before the introduction of the crystal. The space 55 between the first and second rings provides heat isolation from the glass plate when the ring 59 is joined to the ring 51 by alloy soldering or welding. Elastomer is added to the spaces 55 and 63 after all of the rings are joined.

Before assembly, the glass plate 3 has been formed with the barriers 23, which include projections 65 and recesses 67, and with the desiccant-receiving recesses 27. The sealing ring 21 has been formed with the barriers 31, which include the recesses 69 and the projections 71, and with the desiccant-receiving recesses 37 and 39. The thin gamma window plate 35 is formed with the barriers 33, which include recesses 73 and projections 75. The crystal has been coated with the cladding 9 and the reflector 15. The cladding layers preferably have an index of refraction of about 1.5, with the refraction of the inner layer being slightly greater than the index of refraction of the outer layer. An optical coupler could be an acrylic having an index of refraction of about 1.42 to 1.48, and the glass mounting plate may have an index of refraction of about 1.5 to 1.6.

In the mounting procedure, the first ring 43 is attached to the surrounding outer surface of the plate, and then the second ring 51 is attached to the first ring.

Then the optical coupler 7 is spread as a liquid on the lower surface of the crystal 5 and on the center of the upper surface of the glass plate 3. The crystal 5 with its cladding and reflecting coating is placed with one edge of the crystal and optical coupler contacting the glass plate. Then the crystal is rotated into full contact with the glass plate, pressing the crystal as the crystal is lowered to ensure the escape of any gases so that the optical coupler is clear.

Epoxy 41 is placed in the recesses 67, desiccant 29 is placed within the recesses 27, and the mounting ring 21 is placed on top of the glass plate 3 and is pressed into place. Then the outer ring 59 is joined to the second ring 51, anchoring the plate 21 on the mounting plate 3. Then the recesses 55 and 63 are filled with an elastomer.

Elastomer 17 is added to fill the space between the opening 77 in the ring 21 and the reflective layer 15 which surrounds the crystal, and finally an optical coupler 19 is added on top of the reflective layer 15 and on upper edges of the resilient layer 17 to seal the reflective layer and edges of the resilient layer 17 to the inner surface of the gamma ray window plate 35.

In the next step, resin 41 is deposited in the recesses 69 and desiccant is deposited in the recesses 37 and 39 in the sealing ring and the gamma ray window plate 35, which is a thin aluminum sheet. The barrier seals 33 are pressed down into the epoxy. Then the thin ring 79 of the mounting ring 21 is joined by a metal-to-metal seal 81 to the outer surface 83 of the gamma ray window plate 35. Finally, the recess 85 is filled with an elastomer.

By forming the glass-to-metal and the metal-to-metal seals between the glass mounting plate 3 and the first and second rings and the metal-to-metal seals between the second and third metal rings before the crystal is joined to the glass mounting plate, the crystal is protected from increased temperatures. Moisture is prevented from entering the crystal by the metal-to-metal seals and the glass-to-metal seals and by the epoxy-filled barrier seals, and finally by desiccant in the desiccant-containing recesses.

The epoxy-filled barrier seals, because of the serpentine shape of the epoxy which conforms to the shape of the structure, prevent any crack in the epoxy from propagating completely inward within the epoxy, and therefore prevent transfer of moisture through epoxy cracks.

An epoxy multiple barrier seal is shown in FIG. 3. Similar elements have similar numbers. In this case, the metal rings at the outer surface of the glass plate 3 are replaced by an epoxy seal 87. The metal-to-metal seal at the outer edge of the gamma ray window plate 35 is replaced by an epoxy seal 89. Since epoxy 91 shows the entire recesses 69, the outer desiccant-holding recess 39 shown in FIG. 1 is eliminated from FIG. 3.

In the assembly procedure for FIG. 3, the barriers 23 and recesses 27 are preformed in the glass plate 3, and the barriers 25 and 31 and recess 37 are preformed in the mounting ring 21. The barriers 33 are preformed in the gamma ray window plate 35. The cladding 9 and reflecting layer 15 are preformed on the crystal 5.

In the first assembly step, the optical coupler is spread on the lower surface of the crystal 5 and on the upper surface of the mounting plate 3, and the crystal is placed on the mounting plate by first placing an edge of the crystal on the glass plate 3, and then rocking the crystal downward so that the optical coupling is joined in a moving line, which ensures against the entrapment of gas. After the crystal 5 is mounted on the plate 3, the mounting ring 21 is added with the crystal received in central opening 77 and the extension 57 extending downward around the outer surface of the glass plate 3. Epoxy 41 is added to the recesses 67 and desiccant is placed in the recesses 27. Then the epoxy 87 is filled in the space between the downward extension 57 and the outer surface of the glass plate 3. Then the elastomer 17 is added to the space to fill the gap between the opening 17 and the reflective layer 15.

The optical coupler 19 is added atop the reflective layer 15. Epoxy 41 and 91 fills the recesses 69 in the upper surfaces of the mounting plate 21, and desiccant is placed in the recess 37. Then the gamma ray window plate 35 is put in place, and the barriers 33 are pressed down into the epoxy 41. Finally, epoxy 89 is added and the system is ready for use. The barriers prevent continuous cracks of the epoxy which might admit moisture inward by preventing crack propagation. The desiccant traps any moisture molecules which might move inward, and prevents them from entering the surfaces within the reflector and cladding.

Figure 4:
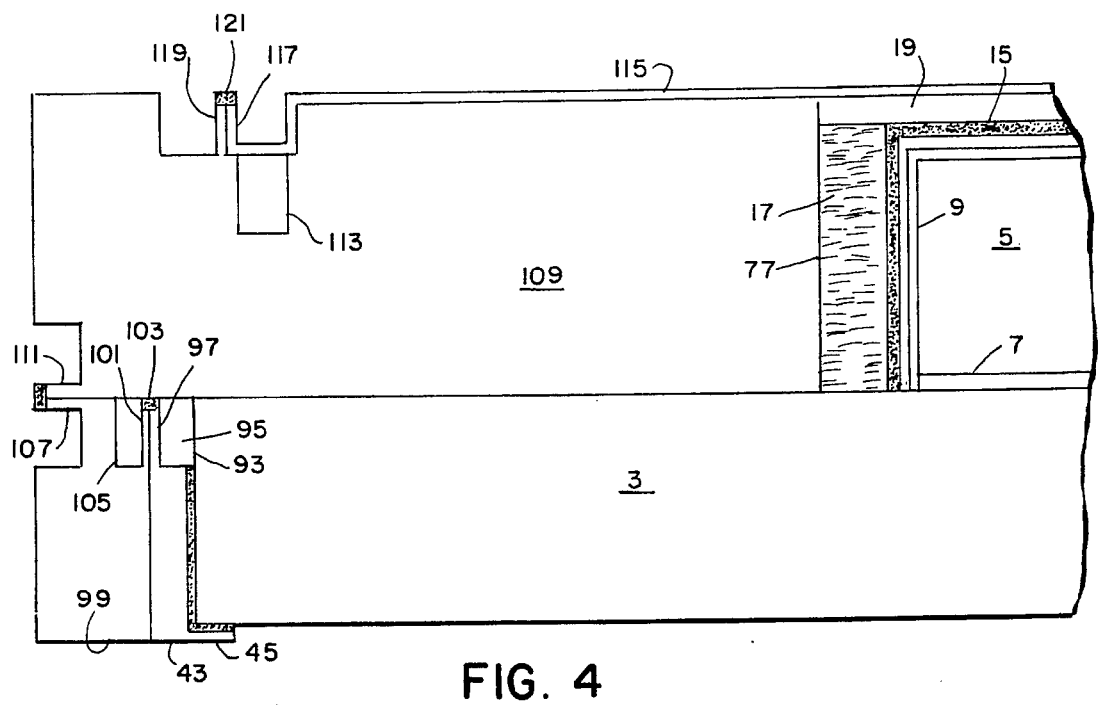
FIG. 4 is a cross-sectional detail of a gamma camera mounting plate assembly showing one preferred embodiment having a crystal or glass plate, multiple cladding layers, a reflective layer and multiple mounting rings which are sealed with a glass-to-metal seal and metal welds.

In FIG. 4, the preferred form of the invention uses multiple low continuous seam welds on low heat sink seams.

A metal ring 43 with an inward projecting lower lip 45 is connected to an outer surface 93 of the glass plate with a glass-to-metal seal, which is preferably an alloy which bonds to a restricted doped area of the glass. The metal ring 43 has a continuous thin upward projection 97. A second metal ring 99 with a complementary thin upward projection 101 is positioned adjacent the first metal ring, and the first and second metal rings are joined by a seam weld 103 or by soldering with an alloy. The rings are joined together by an alloy solder. It is preferable to first electroplate the surfaces to be soldered with a metal such as zinc.

The second ring has a recess 105 adjacent the upper projection 101, and has an outer projection 107.

The crystal 5 is secured on the plate 3, as previously described. Then desiccant is added to the recesses 95 and 105. Large ring 109 is placed atop the glass plate 3. A projection 111, which is complementary to projection 107 on the second ring, is welded or soldered, as previously described. The projections 97, 101, 107 and 111 prevent or reduce heat contact through the glass plate or through the major ring 109 toward the crystal. The plate 109 is preformed with a recess 113 for receiving desiccant.

An elastomer 17 fills the space between the opening 77 and the reflective layer 15, and optical coupling material 19 is added to the top of the reflective layer 15 and the top of the elastomeric coating 17 within the opening 77. Desiccant is placed within recess 113, and a gamma ray window plate 115 with a preformed projection 117 is placed on the top of the optical coupler 19 and ring 109. The ring 109 is formed with an upward facing projection 119, which is complementary to the end surface 121 of the gamma ray window plate 115, and the seam at the tips of the projections 121 and 119 is sealed by welding or soldering, as previously describing, completing the construction of a gamma plate.

While the invention has been described with reference to specific embodiments, modifications and variations of the invention may be constructed without departing from the scope of the invention, which is defined in the following claims.

I claim:

1. A gamma camera plate, comprising a large flat crystal, an optical coupler on the crystal and a large glass plate connected to the optical coupler and having a ledge extending outward beyond the crystal, a cladding surrounding a remainder of the crystal, a reflective layer surrounding the cladding, an elastomer surrounding the reflective layer, an optical coupling overlying the reflective layer, a metal plate overlying the optical coupling and the elastomer and having an extension extending outward beyond the elastomer, a main mounting ring extending around the elastomer and positioned between the metal plate extension and the glass plate ledge, a first set of complementary multiple inter-engaging barriers formed in the glass plate ledge and in the ring, epoxy disposed in the first inter-engaging barriers, a second set of complementary multiple inter-engaging barriers formed in the metal plate extension and in the ring, and epoxy disposed in the second inter-engaging barriers, a first inner recess between the glass plate ledge and the ring and desiccant disposed in the first recess, and a second recess in the ring adjacent the metal plate extension and desiccant disposed in the second recess.

2. The apparatus of claim 1, wherein the cladding comprises a first cladding layer adjacent the crystal and a second cladding layer surrounding the first cladding layer.

3. The apparatus of claim 2, wherein the first and second cladding layers have different indexes of refraction.

4. The apparatus of claim 1, wherein the reflective layer is a metal reflecting layer.

5. The apparatus of claim 4, wherein the reflecting layer is made of metal sputtered, evaporated or deposited on a metal foil.

6. The apparatus of claim 4, wherein the metal reflecting layer is made of gold, silver or aluminum.

7. The apparatus of claim 1, wherein the reflective layer is a diffuse white reflective layer having finely divided reflective powder held in a resin.

8. The apparatus of claim 1, further comprising a glass-to-metal seal between the glass plate and the ring and surrounding the crystal, the glass-to-metal seal further comprising a metal alloy and a metal doped section of the glass plate immediately adjacent the metal alloy.

9. The apparatus of claim 1, wherein the glass plate is thinner than the crystal.

10. The apparatus of claim 1, wherein the glass plate is about one third or less as thick as the crystal.

11. The apparatus of claim 1, wherein the main mounting ring extends around an outer edge of the glass plate, and further comprising a zinc plated aluminum or stainless steel second ring surrounding the outer surface of the glass plate, a glass-to-metal seal between the outer surface of the glass plate and the second ring, a third ring surrounding the second ring, a metal-to-metal seal joining the third ring to the second ring, and a second metal-to-metal seal joining the third ring to the main mounting ring.

12. The apparatus of claim 11, further comprising a thin metal extension on the main mounting ring adjacent the second ring, and wherein the second metal-to-metal seal surrounds an outer surface of the second metal ring and joins the thin metal extension to the second ring, and an elastomer in a recess surrounding the second metal-to-metal seal.

13. The apparatus of claim 12, further comprising an outer desiccant recess in the main ring adjacent an outer portion of the metal plate extension, and desiccant disposed in the outer desiccant recess.

14. A gamma camera plate comprising a flat crystal, an optical coupler on one large flat surface of the crystal, a glass plate connected to the optical coupler, the glass plate having a lateral extension beyond the crystal, a metal ring surrounding the crystal and having a portion laterally extended from the crystal which lies adjacent the lateral extension of the glass plate, a portion of the lateral extension of the glass plate surrounding the crystal being doped prior to sealing with a metal dopant, a metal alloy seal engaging the doped portion of the glass plate and the metal housing.

15. The apparatus of claim 14, further comprising a cladding surrounding a remainder of the crystal which is not contacted by the optical coupler, and a reflective layer overlying the cladding.

16. The apparatus of claim 15, wherein the cladding comprises a first cladding layer in contact with the crystal and a second cladding layer in contact with the first cladding layer, the first and second cladding layers having different indexes of refraction.

17. The apparatus of claim 15, further comprising an elastomer surrounding the reflective layer.

18. The apparatus of claim 14, further comprising complementary inter-engaging barriers in the extended glass adjacent the housing extension, and epoxy positioned in the barriers for providing a long life hermetic seal between the glass plate and extension and the housing extension, whereby the inter-engaging barriers provide an epoxy cracked propagation barrier.

19. The apparatus of claim 18, further comprising recess barriers between the inter-engaging barriers and the crystal for receiving silica gel and preventing moisture ingress.

20. A gamma camera plate, comprising a large flat crystal, an optical coupler on the crystal and a large glass plate connected to the optical coupler and extending outward beyond the crystal, a cladding surrounding a front and a back of the crystal, and a reflective layer surrounding the cladding.

21. A gamma camera plate, comprising a large flat crystal having a front and a back, an optical coupler on the crystal and a large glass plate connected to the optical coupler and extending outward beyond the crystal, a mounting plate surrounding the crystal and overlying the glass plate, elastomeric material surrounding the crystal within an opening in the mounting plate, a gamma ray window plate overlying the back of the crystal, and an optical coupler between the window plate and the back of the crystal.

22. A gamma camera plate, comprising a large flat crystal, an optical coupler on the crystal and a large glass plate connected to the optical coupler and extending outward beyond the crystal, a mounting plate surrounding the crystal and overlying the glass plate, a gamma ray window plate overlying the crystal and mounting plate, and multiple barriers comprising complementary mutually inter-engaging projections and grooves in the glass plate and mounting plate, and in the window plate and mounting plate, and epoxy disposed in the multiple barriers.

23. The apparatus of claim 22, further comprising a first metal ring surrounding outer surfaces of the glass plate, and a glass-to-metal seal connecting the first ring to the outer surface of the glass plate.

24. The apparatus of claim 23, further comprising a second ring surrounding the first ring, and a metal-to-metal seal between the first and second ring.

25. The apparatus of claim 24, wherein the second ring has a thin surface, and wherein the mounting plate has a thin projection, and further comprising a metal-to-metal seal between the thin surface and thin projection.

26. The apparatus of claim 25, wherein the metal-to-metal seal is a seam seal formed by welding or by electroplating and alloy soldering.

27. The method of constructing a gamma camera plate, comprising forming a glass plate with multi-barrier projections and grooves around a locus of a crystal, forming a mounting plate with complementary multiple projections and grooves, coating a large flat surface of a crystal with an optical coupler and coating an area on the glass plate with an optical coupler, contacting an optical coupler-coated edge of the crystal with a coated area on the glass plate, rocking the crystal into full contact with the optical coupling on the glass plate, thereby forming an optical coupling between the crystal and the glass plate without voids or bubbles, placing epoxy in grooves on one of the plates, placing the mounting plate on the glass plate and around the crystal, and pressing the inter-engaging multiple barriers together and filling the spaces between the barriers with epoxy.

28. The method of claim 27, further comprising the initial step of joining a first metal ring to an outer edge of the glass plate with a glass-to-metal seal, and joining a second outer ring to the first ring with a metal-to-metal seal before joining the mounting plate to the glass plate.

29. The method of constructing a gamma camera plate, comprising joining a first metal ring to an outer edge of a glass plate with a glass-to-metal seal, and joining a second outer ring to the first ring with a metal-to-metal seal, coating a large flat surface of a crystal with an optical coupler and coating an area on the glass plate with an optical coupler, contacting an optical coupler-coated crystal with a coated area on a glass plate, pressing the crystal into full contact with the optical coupling on the glass plate, thereby forming an optical coupling between the crystal and the glass plate without voids or bubbles, placing a mounting plate on the glass plate and around the crystal, and joining the mounting plate to the glass plate by joining a thin extension on the second outer ring and a thin extension on the mounting plate with a metal-to-metal seal.

30. A crystal mounting having glass-to-metal seal comprising a glass plate, a metal plate adjacent the glass plate, an area of the glass plate adjacent the metal plate being doped with a metal dopant prior to sealing and an alloy compatible with the dopant contacting and sealing the metal doped area of the glass plate and the metal plate and joining the glass plate and metal plate in a glass-to-metal seal.

31. A gamma camera plate assembly comprising a crystal, an optical coupler on the crystal, a glass plate connected to the optical coupler and extending outward beyond the crystal, a window plate overlying the crystal and having an extension extending outward beyond the crystal, a main mounting plate extending beyond the crystal and the glass plate, a first metal ring surrounding an outer surface of the glass plate, a glass-to-metal seal joining the first ring to the glass plate, the first ring having a first thin extension, a second metal ring adjacent the first ring and having a second thin extension, a first metal-to-metal seal joining the first and second thin extensions and joining the first and second metal rings, the second ring having a third thin extension and the mounting plate having a fourth thin extension, a second metal-to-metal seal joining the third and fourth extensions and joining the second ring and the mounting plate.

32. Apparatus comprising a crystal, an optical coupler on the crystal and a glass plate connected to the optical coupler and having a ledge extending outward beyond the crystal, a cladding surrounding a remainder of the crystal, a reflective layer surrounding the cladding, an elastomer overlying the reflective layer, a plate overlying and having an extension extending outward, a main mounting ring extending around the crystal and positioned between the extension and the ledge, a first set of complementary multiple inter-engaging barriers formed in the ledge and in the ring, epoxy disposed in the first inter-engaging barriers, a first inner recess between the ledge and the ring and desiccant disposed in the first recess.

33. The apparatus of claim 32, further comprising a second set of complementary multiple inter-engaging barriers formed in the extension and in the ring, and epoxy disposed in the second inter-engaging barriers, and a second recess in the ring adjacent the metal plate extension and desiccant disposed in the second recess.

34. The apparatus of claim 32, further comprising a glass-to-metal seal between the glass plate and the ring and surrounding the crystal, the glass-to-metal seal further comprising a metal alloy and a metal doped section of the glass plate immediately adjacent the metal alloy.

35. The apparatus of claim 32, wherein the main mounting ring extends around an outer edge of the glass plate, and further comprising a zinc plated aluminum or stainless steel second ring surrounding the outer surface of the glass plate, a glass-to-metal seal between the outer surface of the glass plate and the second ring, a third ring surrounding the second ring, a metal-to-metal seal joining the third ring to the second ring, and a second metal-to-metal seal joining the third ring to the main mounting ring.

36. The apparatus of claim 35, further comprising a thin metal extension on the main mounting ring adjacent the second ring, and wherein the second metal-to-metal seal surrounds an outer surface of the second metal ring and joins the thin metal extension to the second ring, and an elastomer in a recess surrounding the second metal-to-metal seal.

37. The apparatus of claim 36, further comprising an outer desiccant recess in the main ring adjacent an outer portion of the metal plate extension, and desiccant disposed in the outer desiccant recess.

38. Apparatus comprising a crystal, an optical coupler on one surface of the crystal, a glass plate connected to the optical coupler, the glass plate having a lateral extension beyond the crystal, a metal ring surrounding the crystal and having a portion laterally extended from the crystal which lies adjacent the lateral extension of the glass plate, a portion of the lateral extension of the glass plate surrounding the crystal being doped with a metal dopant prior to sealing, a metal alloy seal engaging the doped portion of the glass plate and the metal housing.

39. The apparatus of claim 38, further comprising complementary inter-engaging barriers in the extended glass adjacent the housing extension, and epoxy positioned in the barriers for providing a long life hermetic seal between the glass plate and extension and the housing extension, whereby the inter-engaging barriers provide an epoxy crack propagation barrier.

40. The apparatus of claim 39, further comprising recess barriers between the inter-engaging barriers and the crystal for receiving silica gel and preventing moisture ingress.

41. Apparatus comprising a crystal, an optical coupler on the crystal and a glass plate connected to the optical coupler and extending outward beyond the crystal, a cladding surrounding a remainder of the crystal, a reflective layer surrounding the cladding, an elastomer surrounding the reflective layer, a gamma ray plate overlying the elastomer and extending outward beyond the elastomer, a metal ring extending around the elastomer between the extended gamma ray plate and the extended glass plate, a first set of multiple complementary inter-engaging barriers formed between the glass plate and the ring, and epoxy disposed in the first inter-engaging barriers, a second set of complementary inter-engaging barriers formed in the extended gamma ray plate and in the ring, and epoxy disposed between the inter-engaging barriers, a first recess between the glass plate extension and the ring and desiccant disposed in the recess, and a second recess in the ring adjacent the extended plate and desiccant disposed in the second set of recesses.

42. Apparatus comprising a crystal having a back and a front, an optical coupler on the crystal and a glass plate connected to the optical coupler and extending outward beyond the crystal, a mounting surrounding the crystal and overlying the glass plate, elastomeric material surrounding the crystal within an opening in the mounting, a gamma ray window overlying the back of the crystal, and an optical coupler between the window plate and the back of the crystal.

43. Apparatus comprising a crystal, an optical coupler on the crystal and a glass plate connected to the optical coupler and extending outward beyond the crystal, a mounting surrounding the crystal and overlying the glass plate, a gamma ray window overlying the crystal and mounting, and multiple barriers comprising complementary mutually inter-engaging projections and grooves in the glass plate and mounting plate, and in the window and mounting plate, and epoxy disposed in the multiple barriers.

44. The apparatus of claim 43, further comprising a first metal ring surrounding outer surfaces of the glass plate, and a glass-to-metal seal connecting the first ring to the outer surface of the glass plate.

45. The apparatus of claim 44, further comprising a second ring surrounding the first ring, and a metal-to-metal seal between the first and second ring.

46. The apparatus of claim 45, wherein the second ring has a thin surface, and wherein the mounting has a thin projection, and further comprising a metal-to-metal seal between the thin surface and thin projection.

47. The apparatus of claim 46, wherein the metal-to-metal seal is a seam seal formed by welding or by electroplating and alloy soldering.

48. The method of constructing a detector, comprising forming a glass plate with multi-barrier projections and grooves around a locus of a crystal, forming a mounting plate with complementary multiple projections and grooves, coating a surface of a crystal with an optical coupler and coating an area on the glass plate with an optical coupler, contacting an edge of the optical coupler-coated surface of the crystal with a coated area on the glass plate, rocking the crystal into full contact with the optical coupling on the glass plate, thereby forming an optical coupling between the crystal and the glass plate without voids or bubbles, placing epoxy in grooves on one of the plates, placing the mounting plate on the glass plate and around the crystal, and pressing the inter-engaging multiple barriers together and filling the spaces between the barriers with epoxy.

49. The method of claim 48, further comprising the initial step of joining a first metal ring to an outer edge of the glass plate with a glass-to-metal seal, and joining a second outer ring to the first ring with a metal-to-metal seal before joining the mounting plate to the glass plate.

50. The method of constructing a detector, comprising joining a first metal ring to an outer edge of a glass plate with a glass-to-metal seal, and joining a second outer ring to the first ring with a metal-to-metal seal, coating a surface of a crystal with an optical coupler and coating an area on the glass plate with an optical coupler, contacting an optical coupler-coated crystal with a coated area on a glass plate, pressing the crystal into full contact with the optical coupling on the glass plate, thereby forming an optical coupling between the crystal and the glass plate without voids or bubbles, placing a mounting on the glass plate and around the crystal, and joining the mounting to the glass plate by joining a thin extension on the second outer ring and a thin extension on the mounting with a metal-to-metal seal.

51. An assembly comprising a crystal, an optical coupler on the crystal, a glass plate connected to the optical coupler and extending outward beyond the crystal, a window plate overlying the crystal and having an extension extending outward beyond the crystal, a main mounting plate extending beyond the crystal and the glass plate, a first metal ring surrounding an outer surface of the glass plate, a glass-to-metal seal joining the first ring to the glass plate, the first ring having a first thin extension, a second metal ring adjacent the first ring and having a second thin extension, a first metal-to-metal seal joining the first and second thin extensions and joining the first and second metal rings, the second ring having a third thin extension and the mounting having a fourth thin extension, a second metal-to-metal seal joining the third and fourth extensions and joining the second ring and the mounting.

52. The apparatus of claim 32, wherein the optical coupling is an elastomer with an appropriate index of refraction.

* * * * *